(No Model.)

T. A. HODGSON.
KNOB ATTACHMENT.

No. 529,792. Patented Nov. 27, 1894.

Witnesses:
John Grist
A. H. Horsey.

Thomas A. Hodgson
Inventor
By Henry Grist
Attorney.

UNITED STATES PATENT OFFICE.

THOMAS ANDERSON HODGSON, OF OTTAWA, CANADA.

KNOB ATTACHMENT.

SPECIFICATION forming part of Letters Patent No. 529,792, dated November 27, 1894.

Application filed April 12, 1894. Serial No. 507,215. (No model.)

*To all whom it may concern:*

Be it known that I, THOMAS ANDERSON HODGSON, of the city of Ottawa, in the Province of Ontario, in the Dominion of Canada, have invented certain new and useful Improvements in Knob Attachments; and I do hereby declare that the following is a full, clear, and exact description of the same, reference being had to the accompanying drawings, in which—

Figure 1:
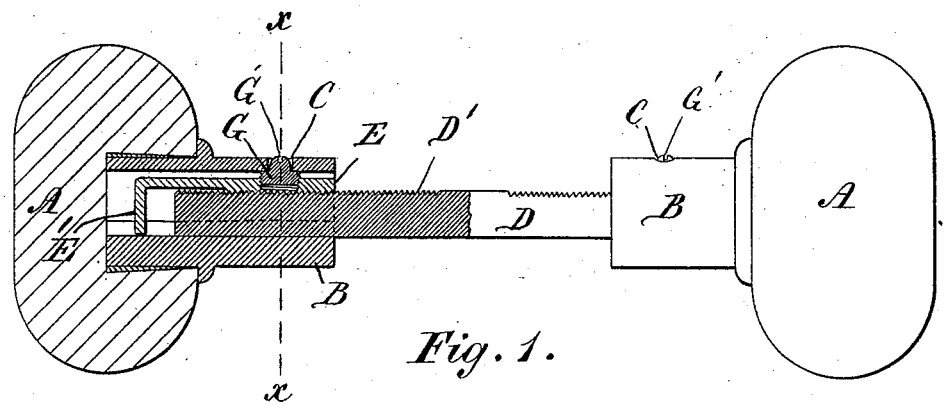
Figure 2:
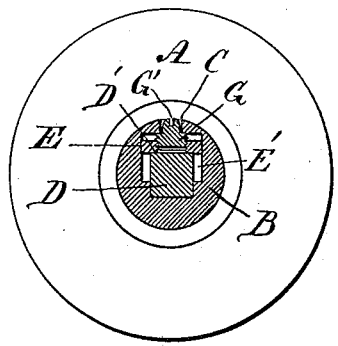
Figure 3:
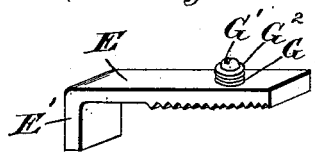

Figure 1, is an elevation of a spindle, knob-neck or shank and knob, partly in section, embodying my invention or improvement. Fig. 2, is a section of the same on line X X; and Fig. 3, is a perspective view of the serrated locking plate and clamping screw, removed from the knob and spindle.

My invention has for its object to attach spindles to knobs, whereby detachment can be effected only by a tool; the spindle being adapted to doors or locks of greater or less thickness and the knob-neck secured, so as not to wabble.

My invention consists of a serrated locking-plate engaging a serrated spindle inserted in the knob-neck or shank, said plate having a thrust-screw provided with a contracted plain end entering a radial hole in said neck, so that by turning the screw by a tool inserted in said hole, the serrated faces of the plate and spindle are forced together by the push of the screw against the interior of the neck, and a portion of the end of the screw entering the hole prevents withdrawal of the plate and spindle.

A, is the knob; B, the tubular knob-neck or shank fastened into said knob or forming an integral part thereof, and said shank is provided with a tool hole C, and D, the rectangular spindle having a serrated face D'. The lower part of the tubular knob-neck fits the square of the spindle, and the upper part of the cavity is enlarged by thinning the shell of the neck so that the spindle will be central to the knob and the space allow insertion of the locking-plate and width for the same, to permit of a screw hole to be made in said plate larger than the tool hole C.

E, is the locking-plate having a serrated face to match the serrations in the spindle, and said plate preferably, has a rectangularly bent end or leg E', in length coinciding to the square of the spindle, to stand within the cavity of the neck or shank, so that when the spindle is utilized to nearly its full length, and but few serrations engage, the grip of these is assisted by the leg maintaining the plate in a normal position.

The locking plate E, has a screw G which is larger than the tool hole C, and said screw is provided with a reduced or rounded end having a tool slot G', to turn the screw, and said end enters the radial hole C, in the knob-neck, through which hole is inserted the tool to turn the screw. The reduced or rounded end of the screw forms an annular shoulder or base $G^2$, Fig. 3 which seats around said hole, so that when the screw is turned, the thrust of the screw forces the plate E, against the spindle, and causes it to bind in the neck, and the reduced or rounded end of the screw entering the radial hole in said neck prevents the serrated plate and spindle from being pulled out of the neck, or shank.

The screw G, is preferably left hand in the plate, so that to tighten the spindle in the knob-neck, the screw will have to be turned as ordinarily, to the right, but if desired, the screw may have the usual right-hand thread, and be turned to the left to tighten the spindle in the neck.

To place the spindle in the tubular shank of the knob, the screw G, is screwed into the locking plate E, until the bottom of the screw reaches the serrations in said plate. The serrated faces of the plate and spindle are then placed together and the spindle, plate and screw inserted in the tubular neck or shank of the knob until the screw is opposite to the hole C, in said shank. The screw is then turned by a tool introduced into said hole until the shoulder $G^2$, of the screw meets the interior top of the shank. The thrust of the screw will then force the serrated faces of the plate and spindle together, and the reduced end of the screw will have entered the tool hole C, thereby preventing withdrawal of the spindle. To release the spindle, screw G, is screwed into the plate by a tool entering hole C, and turned, until the reduced or rounded end of the screw is clear of said hole. The spindle and plate can then be pulled out of the tubular shank of the knob.

I claim as my invention—

1. The combination with a knob having a tubular shank provided with a radial hole, and a lock spindle provided with a serrated face matching the serrations of a locking plate, of a clamping screw larger than said hole and screwing into said plate, said screw rounded or reduced at the end to partially enter said hole and engage the interior of the shank around the circumference of the hole, whereby unscrewing the screw causes the screw to clamp the spindle and plate in the tubular shank and said shank covers the screw partially, when the knob is attached to the spindle, as set forth.

2. The combination of a knob having a tubular shank provided with a radial hole, a lock spindle and locking plate inserted in said shank, said plate having a bent end or leg to keep the plate parallel with the spindle when short-connected, and a screw screwing into said plate and inserted with said spindle into said shank, said screw having near one end an enlargement or shoulder to engage the inside of said shank around the radial hole, and a rounded or reduced end entering said hole when the screw is unscrewed by a tool inserted in said hole, whereby unscrewing the screw causes the thrust of the screw to clamp the plate and spindle together for attachment of the knob, as set forth.

THOMAS ANDERSON HODGSON.

Witnesses:
JOHN GRIST,
HENRY SMITH.